(12) United States Patent
Feldermann et al.

(10) Patent No.: US 8,779,050 B2
(45) Date of Patent: *Jul. 15, 2014

(54) IMPACT MODIFIED POLYCARBONATE COMPOSITIONS

(75) Inventors: Achim Feldermann, Duesseldorf (DE); Andreas Seidel, Dormagen (DE); Eckhard Wenz, Cologne (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,272

(22) Filed: Jul. 20, 2012

(65) Prior Publication Data

US 2012/0302694 A1 Nov. 29, 2012

Related U.S. Application Data

(63) Continuation of application No. 12/484,388, filed on Jun. 15, 2009, now Pat. No. 8,338,533.

(30) Foreign Application Priority Data

Jun. 16, 2008 (DE) .......................... 10 2008 028 571

(51) Int. Cl.
C08L 51/04 (2006.01)
C08L 55/02 (2006.01)
C08L 33/00 (2006.01)

(52) U.S. Cl.
USPC ................ 524/504; 525/479; 525/64; 525/67

(58) Field of Classification Search
USPC ............ 524/430, 504, 508, 407; 252/479, 64, 252/67
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 3,419,634 A | 12/1968 | Vaughn, Jr. et al. | |
| 3,553,167 A | 1/1971 | Schnell et al. | |
| 3,942,780 A | 3/1976 | Clement | |
| 4,075,173 A | 2/1978 | Maruyama et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,877,831 A | 10/1989 | Hongo et al. | |
| 4,888,388 A | 12/1989 | Hongo et al. | |
| 5,219,932 A | 6/1993 | Yamamoto et al. | |
| 5,679,759 A | 10/1997 | Wittmann et al. | |
| 5,807,914 A | 9/1998 | Obayashi et al. | |
| 5,840,802 A | 11/1998 | DeRudder et al. | |
| 2002/0147261 A1 | 10/2002 | Warth et al. | |
| 2008/0176988 A1* | 7/2008 | Seidel et al. | ................. 524/504 |

FOREIGN PATENT DOCUMENTS

| | | |
|---|---|---|
| DE | 3832396 | 2/1990 |
| DE | 196 35 078 | 3/1998 |
| EP | 0430134 | 6/1991 |
| EP | 0 663 425 | 7/1995 |
| GB | 1552558 | 9/1979 |
| WO | 2008/086961 | 7/2008 |

OTHER PUBLICATIONS

International Preliminary Report on Patent Ability and Written Opinion of PCT/EP2009/003982 Mailed Jan. 27, 2011.

* cited by examiner

Primary Examiner — James J Seidleck
Assistant Examiner — Deve E Valdez
(74) Attorney, Agent, or Firm — Miles & Stockbridge P.C.

(57) ABSTRACT

The present invention relates to non-aging, impact-modified polycarbonate compositions and molding compositions comprising: A) from 60 to 86 parts by weight (based on the sum of components A+B+C) of aromatic polycarbonate and/or aromatic polyester carbonate, B) from 4 to 12 parts by weight (based on the sum of components A+B+C) of graft polymer comprising: B.1 from 10 to 50 wt. % (based on the graft polymer B) of a shell of at least one vinyl monomer, and B.2 from 90 to 50 wt. % (based on the graft polymer B) of a graft base of silicone-acrylate composite rubber, C) from 10 to 30 parts by weight (based on the sum of components A+B+C) of a polymer or copolymer based on vinyl monomer, and D) from 0 to 20 parts by weight of polymer additives.

13 Claims, No Drawings

IMPACT MODIFIED POLYCARBONATE COMPOSITIONS

CROSS-REFERENCE TO RELATED APPLICATIONS

This Application is a Continuation of U.S. patent application Ser. No. 12/484,388 filed Jun. 15, 2009 now U.S. Pat. No. 8,338,533, which claims priority to DE 102008028571.4 filed Jun. 16, 2008, the entire contents of each are herein incorporated by reference in their entireties.

BACKGROUND OF THE INVENTION

1. Field of the Invention

The present invention relates to non-aging, impact-modified polycarbonate compositions and moulding compositions which are distinguished by an improved balance of multiaxial low-temperature impact strength and flowability, good dyeability and a high heat distortion resistance.

2. Description of Related Art

Compositions comprising polycarbonate, graft polymer based on rubbery-elastic, non-aging graft base and vinyl aromatic copolymer are known in principle.

DE-A 4434965, for example, discloses such compositions that have an improved balance of low-temperature strength, rigidity and flow behaviour and that comprise polycarbonate (A), graft polymer with rubbery-elastic graft bases having a specific particle size (B) and thermoplastic vinyl aromatic (co)polymer (C), wherein the relative proportions B to C are limited. Silicone-acrylate composite rubbers are not disclosed as the rubbery-elastic graft base in this application.

EP-A 0537014 discloses compositions having improved low-temperature strength that comprise a thermoplastic resin, for example a polycarbonate, a vinyl polymer or a mixture thereof, and an impact-modifying amount of a specific multiphase graft polymer based on polyorganosiloxane/polyvinyl. Compositions comprising polycarbonate, vinyl polymer and graft polymer in which the vinyl polymer and the graft polymer are used in specific relative proportions are not disclosed.

EP-A 0486853 discloses compositions having improved dyeability through the use of pigments comprising a specific graft polymer based on a polyorganosiloxane-polyalkyl (meth)acrylate compound rubber and optionally further thermoplastics such as, for example, polycarbonate.

EP-A 0430134 discloses compositions that have excellent impact strength, surface hardness and surface quality and that comprise polycarbonate and a specific polyorganosiloxane graft polymer based on a composite rubber as graft base, which comprises from 1 to 10 wt. % polyorganosiloxane rubber and from 99 to 90 wt. % polyalkyl (meth)acrylate rubber in non-separable form. It is disclosed that the compositions can additionally also contain homopolymers or copolymers based on vinyl monomers. There is no mention in this application of particular advantages that can be achieved in terms of properties when the three components are used in the specific mixing ratio.

EP-A 0307963 discloses compositions that have good resistance to chemicals, to weathering and to heat as well as good impact strength and that comprise polycarbonate, graft polymer based on a silicone-butyl acrylate composite rubber base and vinyl copolymer. However, the disclosed compositions exhibit a disadvantageous ratio of graft polymer content to vinyl copolymer content. The dyeing of such compositions in dark and brilliant colours requires large amounts of pigments, which result in a deterioration of the mechanical properties of the composition.

EP-A 1334153 discloses compositions that have improved stability to heat aging, a high surface quality and good processability and that comprise polycarbonate, graft polymer based on silicone-acrylate composite rubber, vinyl copolymer and mineral filler (glass fibres). These compositions have a strength that is inadequate for many applications—in particular at low temperatures.

SUMMARY OF THE INVENTION

An object of the present invention was to provide non-aging polycarbonate compositions and moulding compositions which are distinguished by an improved balance of multiaxial low-temperature strength and melt flowability, by good dyeability and by a high heat distortion resistance.

A particular object of the present invention was to provide non-aging polycarbonate compositions, which can be dyed even in dark and brilliant colours, for example for use as unlacquered automotive interior components and automotive bodywork parts, which do not exhibit splintering fracture down to $-10°$ C. in application-relevant ductility tests, have a melt viscosity, measured at 260° C. and a shear rate of 1000 $s^{-1}$, of not more than 250 Pas and a heat distortion resistance, measured as Vicat B120, of at least 125° C.

It has been found, surprisingly, that the desired property profile can be exhibited by a composition comprising A) from 60 to 86 parts by weight, preferably from 65 to 80 parts by weight, particularly preferably from 70 to 80 parts by weight (based on the sum of components A+B+C) of aromatic polycarbonate and/or aromatic polyester carbonate, B) from 4 to 12 parts by weight, preferably from 5 to 10 parts by weight, particularly preferably from 6 to 10 parts by weight (based on the sum of components A+B+C) of graft polymer comprising B.1 from 10 to 50 wt. %, preferably from 20 to 40 wt. % (in each case based on the graft polymer B) of a shell of at least one vinyl monomer and B.2 from 90 to 50 wt. %, preferably from 80 to 60 wt. % (in each case based on the graft polymer B) of one or more graft bases of silicone-acrylate composite rubber, C) from 10 to 30 parts by weight, preferably from 12 to 25 parts by weight, particularly preferably from 14 to 20 parts by weight (based on the sum of components A+B+C) of a polymer or copolymer based on vinyl monomer, and D) from 0 to 20 parts by weight, preferably from 0.1 to 10 parts by weight, particularly preferably from 0.2 to 5 parts by weight (based on the sum of components A+B+C) of polymer additives, wherein components B and C are present in a ratio of the parts by weight of B:C in the range from 1:1.3 to 1:3.5, preferably in the range from 1:1.5 to 1:3.0, particularly preferably in the range from 1:1.6 to 1:2.7, wherein the composition is free of inorganic fillers, and wherein all parts by weight in the present application are so normalised that the sum of the parts by weight of components A+B+C in the composition is 100.

Additional objects, features and advantages of the invention will be set forth in the description which follows, and in part, will be obvious from the description, or may be learned by practice of the invention. Objects, features and advantages of the invention may be realized and obtained by means of the instrumentalities and combination particularly pointed out in the appended claims.

DETAILED DESCRIPTION OF A PREFERRED EMBODIMENT

Component A

Aromatic polycarbonates and/or aromatic polyester carbonates according to component A that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates can be carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates include preferably those of formula (I)

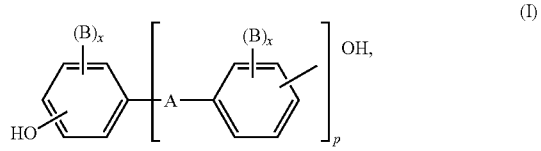

(I)

wherein
A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which further aromatic rings optionally containing heteroatoms can be fused,
or a radical of formula (II) or (III)

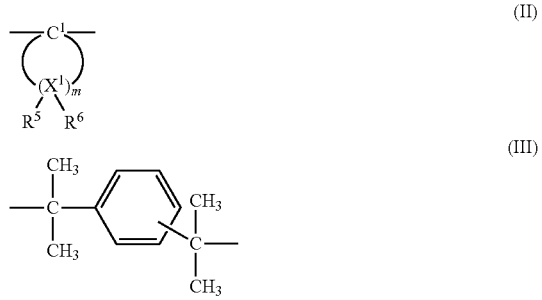

B is in each case $C_1$- to $C_{12}$-alkyl, preferably methyl, halogen, preferably chlorine and/or bromine,
x each independently of the other is 0, 1 or 2,
p is 1 or 0, and
$R^5$ and $R^6$ can be chosen individually for each $X^1$ and each independently of the other is hydrogen or $C_1$- to $C_6$-alkyl, preferably hydrogen, methyl or ethyl,
$X^1$ is carbon and
m is an integer from 4 to 7, preferably 4 or 5, with the proviso that on at least one atom $X^1$, $R^5$ and $R^6$ are simultaneously alkyl.

Preferred diphenols include hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetra-brominated or chlorinated derivatives thereof such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane, 2,2-Bis-(4-hydroxyphenyl)-propane (bisphenol A) is particularly preferred.

The diphenols can be used on their own and/or in the form of arbitrary mixtures. The diphenols are known in the literature or are obtainable according to processes known to one of skill in art in the literature.

Chain terminators suitable for the preparation of thermoplastic aromatic polycarbonates include, for example, phenol, p-chlorophenol, p-tert-butylphenol or 2,4,6-tribromophenol but also long-chained alkylphenols, such as 4-[2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates can be branched in a known manner, preferably by the incorporation of from 0.05 to 2.0 mol %, based on the sum of the diphenols used, of compounds advantageously having a functionality of three or more than three, for example those having three or more phenolic groups.

Both homopolycarbonates and copolycarbonates are suitable. For the preparation of copolycarbonates of component A according to the present invention, it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. The preparation of copolycarbonates containing polydiorganosiloxanes is described in DE-A 3 334 782.

Preferred polycarbonates in addition to the bisphenol A homopolycarbonates include the copolycarbonates of bisphenol A, advantageously with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates can preferably be diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as a bifunctional acid derivative.

Suitable chain terminators for the preparation of the aromatic polyester carbonates, in addition to the monophenols already mentioned, also include chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is advantageously in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also optionally contain aromatic hydroxycarboxylic acids incorporated therein.

The aromatic polyester carbonates can be both linear and/or branched in any known manner (see in this connection DE-A 2 940 024 and DE-A 3 007 934).

There can optionally be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides if desired for any reason.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks and/or distributed randomly.

In a preferred embodiment of the present invention, the aromatic polycarbonates and aromatic polyester carbonates advantageously have a weight-average molecular weight ($M_w$, measured, for example, by GPC, ultracentrifugation or scattered light measurement) of from 22,000 to 32,000 g/mol, particularly preferably from 24,000 to 28,000 g/mol.

The thermoplastic aromatic polycarbonates and polyester carbonates can be used on their own and/or in an arbitrary mixture.

Component B

The graft copolymers B can generally be prepared by radical polymerisation, for example by emulsion, suspension, solution or mass polymerisation, preferably by emulsion polymerisation.

Suitable monomers B.1 include vinyl monomers such as vinyl aromatic compounds and/or vinyl aromatic compounds substituted on the ring (such as styrene, α-methylstyrene, p-methylstyrene, p-chlorostyrene), methacrylic acid ($C_1$-$C_8$)-alkyl esters (such as methyl methacrylate, ethyl methacrylate, 2-ethylhexyl methacrylate, allyl methacrylate), acrylic acid ($C_1$-$C_8$)-alkyl esters (such as methyl acrylate, ethyl acrylate, n-butyl acrylate, tert-butyl acrylate), organic acids (such as acrylic acid, methacrylic acid) and/or vinyl cyanides (such as acrylonitrile and methacrylonitrile) and/or derivatives (such as anhydrides and imides) of unsaturated carboxylic acids (for example maleic anhydride and N-phenyl-maleimide). These vinyl monomers can be used on their own or in mixtures of at least two monomers.

Preferred monomers B.1 can be selected from at least one of the monomers styrene, methyl methacrylate, n-butyl acrylate and acrylonitrile. Particular preference is given to the use of methyl methacrylate or a mixture of styrene and acrylonitrile as the monomer B.1.

The glass transition temperature of the graft base B.2 is typically <10° C., preferably <0° C., particularly preferably <−20° C. The graft base B.2 generally has a mean particle size (d50 value) of from 0.05 to 10 μm, preferably from 0.06 to 5 μm, particularly preferably from 0.1 to 1 μm.

The mean particle size ($d_{50}$ value) is the diameter above and below which in each case 50 wt. % of the particles lie. It can be determined by means of ultracentrifuge measurement (W. Scholtan, H. Lange, Kolloid-Z. and Z. Polymere 250 (1972), 782-796).

The graft base B.2) can comprise composite rubbers of silicone rubber and acrylate rubber, these two types of rubber being present, for example, in the form of a physical mixture or the silicone rubber and the acrylate rubber, for example, forming an interpenetrating network as a result of their preparation or, for example, the silicone rubber and the acrylate rubber forming a graft base that has a core-shell structure. Preferred graft bases B.2) include composite rubbers of from 10 to 70 wt. %, particularly preferably from 20 to 60 wt. %, silicone rubber and from 90 to 30 wt. %, particularly preferably from 80 to 40 wt. %, butyl acrylate rubber (the indicated wt. % is here based in each case on the graft base B.2).

The silicone-acrylate rubbers are preferably composite rubbers having at least one graft-active site. The silicone rubber and the acrylate rubber preferably interpenetrate in the composite rubber so that they cannot substantially be separated from one another.

Silicone-acrylate rubbers are known and described, for example, in U.S. Pat. No. 5,807,914, EP 430134 and U.S. Pat. No. 4,888,388.

Silicone rubber components of the silicone-acrylate rubber according to B.2 can preferably be prepared by emulsion polymerisation, in which the siloxane monomer structural units, crosslinkers or branching agents (IV) and optionally grafting agents (V) can be used.

There can be used as the siloxane monomer structural units, for example and preferably, dimethylsiloxane or cyclic organosiloxanes having at least 3 ring members, preferably from 3 to 6 ring members, such as, for example and preferably, hexamethylcyclotrisiloxane, octamethylcyclotetrasiloxane, decamethylcyclopentasiloxane, dodecamethylcyclohexasiloxane, trimethyl-triphenyl-cyclotrisiloxane, tetramethyl-tetraphenyl-cyclotetrasiloxane, octaphenylcyclotetrasiloxane.

The organosiloxane monomers can be used on their own and/or in the form of mixtures of 2 or more monomers. The silicone rubber preferably contains not less than 50 wt. % and particularly preferably not less than 60 wt. % organosiloxane, based on the total weight of the silicone rubber component.

As crosslinkers or branching agents (IV) there can be preferably used silane-based crosslinkers having a functionality of 3 or 4, particularly preferably 4. Preferred examples which may be mentioned include: trimethoxymethylsilane, triethoxyphenylsilane, tetramethoxysilane, tetraethoxysilane, tetra-n-propoxysilane and tetrabutoxysilane. The crosslinker can be used on its own and/or in a mixture of two or more. Tetraethoxysilane is particularly preferred in some cases.

A crosslinker can be used, for example, in an amount in the range from 0.1 to 40 wt. %, based on the total weight of the silicone rubber component. The amount of crosslinker is preferably so chosen that the degree of swelling of the silicone rubber, measured in toluene, is from 3 to 30, preferably from 3 to 25 and particularly preferably from 3 to 15. The degree of swelling is defined as the weight ratio of the amount of toluene absorbed by the silicone rubber when it is saturated with toluene at 25° C. and the amount of silicone rubber in the dry state. The determination of the degree of swelling is described in detail in EP 249964, which is incorporated herein by reference.

Tetrafunctional branching agents are often preferred to trifunctional branching agents because the degree of swelling can then more easily be controlled within the above-described limits.

Suitable grafting agents (V) are compounds that are capable of forming structures of the following formulae:

$$CH_2=C(R^2)-COO-(CH_2)_p-SiR^1_nO_{(3-n)/2} \quad (V-1)$$

$$CH_2=CH-SiR^1_nO_{(3-n)/2} \quad (V-2) \text{ or}$$

$$HS-(CH_2)_p-SiR^1_nO_{(3-n)/2} \quad (V-3),$$

wherein
$R^1$ represents $C_1$-$C_4$-alkyl, preferably methyl, ethyl or propyl, or phenyl,
$R^2$ represents hydrogen or methyl,
n denotes 0, 1 or 2 and
p denotes an integer from 1 to 6.

Acryloyl- or methacryloyl-oxysilanes are particularly suitable for forming the above-mentioned structure (V-1) and have a high grafting efficiency. Effective formation of the graft chains is thereby often ensured, and the impact strength of the resulting resin composition is accordingly typically promoted. Preferred examples which may be mentioned include: β-methacryloyloxy-ethyldimethoxymethyl-silane, γ-methacryloyloxy-propylmeth-oxydimethyl-silane, γ-methacryloyloxy-propyldimethoxymethyl-silane, γ-methacryloyloxy-propyltrimethoxy-silane, γ-methacryloyloxy-propylethoxydiethyl-silane, γ-methacryloyloxy-propyldiethoxymethyl-silane, δ-methacryloyl-oxybutyldiethoxymethyl-silane or mixtures thereof.

Preferably from 0 to 20 wt. % of a suitable grafting agent, based on the total weight of the silicone rubber, is used.

The silicone rubber can be prepared by any method such as emulsion polymerisation, as described, for example, in U.S. Pat. No. 2,891,920 and U.S. Pat. No. 3,294,725. The silicone rubber is thereby obtained in the form of an aqueous latex. To that end, a mixture containing organosiloxane, crosslinker and optionally grafting agent is mixed with water, with shearing, for example by means of a homogeniser, in the presence of an emulsifier based, in a preferred embodiment, on sulfonic acid, such as, for example, alkylbenzenesulfonic acid or alkylsulfonic acid, the mixture polymerising completely to give the silicone rubber latex. An alkylbenzenesulfonic acid is particularly suitable because it acts not only as an emulsifier but also as a polymerisation initiator. In this case, a combination of the sulfonic acid with a metal salt of an alkylbenzenesulfonic acid or with a metal salt of an alkylsulfonic acid is advantageous because the polymer is thereby stabilised during the subsequent graft polymerisation.

After the polymerisation, the reaction is ended by neutralising the reaction mixture by adding an aqueous alkaline solution, for example by adding an aqueous sodium hydroxide, potassium hydroxide or sodium carbonate solution.

Suitable polyalkyl (meth)acrylate rubber components of the silicone-acrylate rubbers according to B.2 can be prepared, for example, from methacrylic acid alkyl esters and/or acrylic acid alkyl esters, a crosslinker (VI) and a grafting agent (VII). Examples of preferred methacrylic acid alkyl esters and/or acrylic acid alkyl esters include the $C_1$- to $C_8$-alkyl esters, for example methyl, ethyl, n-butyl, tert-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, and mixtures of these monomers. n-Butyl acrylate is particularly preferred.

As crosslinkers (VI) for the polyalkyl (meth)acrylate rubber component of the silicone-acrylate rubber there can be used monomers having more than one polymerisable double bond. Preferred examples of crosslinking monomers include esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, propylene glycol dimethacrylate, 1,3-butylene glycol dimethacrylate and 1,4-butylene glycol dimethacrylate. The crosslinkers can be used on their own or in mixtures of at least two crosslinkers.

Examples of preferred grafting agents (VII) include allyl methacrylate, triallyl cyanurate, triallyl isocyanurate or mixtures thereof. Allyl methacrylate can also be used as crosslinker (VI). The grafting agents can be used on their own and/or in mixtures of at least two grafting agents.

The amount of crosslinker (VI) and grafting agent (VII) is advantageously from 0.1 to 20 wt. %, based on the total weight of the polyalkyl (meth)acrylate rubber component of the silicone-acrylate rubber.

The silicone-acrylate rubber can be prepared, for example, by first preparing the silicone rubber according to B.2.1 in the form of an aqueous latex. The latex is then enriched with the methacrylic acid alkyl esters and/or acrylic acid alkyl esters that are to be used, the crosslinker (VI) and the grafting agent (VII), and a polymerisation is carried out. Preference is given to an emulsion polymerisation initiated by radicals, for example by a peroxide, an azo or a redox initiator. Particular preference is given to the use of a redox initiator system, especially of a sulfoxylate initiator system prepared by combination of iron sulfate, disodium ethylenediaminetetraacetate, rongalite and hydroperoxide.

The grafting agent (V) that is used in the preparation of the silicone rubber preferably has the effect of bonding the polyalkyl (meth)acrylate rubber component covalently to the silicone rubber component. In the polymerisation, the two rubber components interpenetrate and thus form the composite rubber, which can no longer be separated into its constituents of silicone rubber component and polyalkyl (meth)acrylate rubber component after the polymerisation.

For the preparation of the silicone-acrylate graft polymers B mentioned as component B), the monomers B.1 can be grafted on to the rubber base B.2.

The polymerisation methods described, for example, in EP 249964, EP 430134 and U.S. Pat. No. 488,388 can be used thereby.

For example, the graft polymerisation can advantageously be carried out according to the following polymerisation method: In a single- or multi-stage emulsion polymerisation initiated by radicals, the desired vinyl monomers B.1 are polymerised on to the graft base, which is present in the form of an aqueous latex. The grafting efficiency should thereby be as high as possible and is preferably greater than or equal to 10%. The grafting efficiency is significantly dependent on the grafting agent (V) or (VII) that is used. After the polymerisation to the silicone (acrylate) graft rubber, the aqueous latex is added to hot water, in which metal salts, such as, for example, calcium chloride or magnesium sulfate, have previously been dissolved. The silicone (acrylate) graft rubber thereby coagulates and can subsequently be separated.

Component C

Suitable as the vinyl (co)polymers C include polymers of at least one monomer selected from the group of the vinyl aromatic compounds, vinyl cyanides (unsaturated nitriles), (meth)acrylic acid ($C_1$-$C_8$-alkyl esters, unsaturated carboxylic acids as well as derivatives (such as anhydrides and imides) of unsaturated carboxylic acids. Particularly suitable are (co)polymers of C.1 from 50 to 99 parts by weight, preferably from 60 to 80 parts by weight, in particular from 72 to 78 parts by weight (based on component C) of vinyl aromatic compounds and/or vinyl aromatic compounds substituted on the ring, such as styrene, α-methylstyrene, p-methylstyrene, p-chlorostyrene, and/or (meth)acrylic acid ($C_1$-$C_8$-alkyl esters, such as methyl methacrylate, ethyl methacrylate, and C.2 from 1 to 50 parts by weight, preferably from 20 to 40 parts by weight, in particular from 22 to 28 parts by weight (based on component C) of vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate, tert-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers C are generally resin-like, thermoplastic and rubber-free. Particularly preferred as component C is polymethyl methacrylate (PMMA) or a vinyl copolymer containing at least 70 parts by weight (based on component C) of methyl methacrylate and up to 30 parts by weight (based on component C) of at least one comonomer selected from the group styrene, n-butyl acrylate, tert-butyl acrylate and ethyl acrylate. A preferred vinyl copolymer C is also a copolymer of C.1 styrene and C.2 acrylonitrile.

The (co)polymers according to C are known and can be prepared, for example, by radical polymerisation, in particular by emulsion, suspension, solution or mass polymerisation. The (co)polymers preferably have mean molecular weights Mw (weight average, determined by light scattering or sedimentation) of from 15,000 to 200,000.

Component D

The composition can optionally comprise one or more further commercially available polymer additives such as flameproofing agents, flameproofing synergists, antidripping agents (for example compounds of the substance classes of the fluorinated polyolefins, of the silicones as well as aramid fibres), lubricants and mould release agents (for example pentaerythritol tetrastearate), nucleating agents, stabilisers, antistatics (for example conductive blacks, carbon fibres, carbon nanotubes as well as organic antistatics such as polyalkylene ethers, alkylsulfonates or polyamide-containing polymers), as well as colourings and pigments, in amounts such that they do not impair the mechanical properties of the composition to the extent that the target property profile (no splintering fracture at −10° C.) is no longer fulfilled.

There can be used as flameproofing agents, preferably phosphorus-containing flameproofing agents, in particular selected from the groups of the monomeric and oligomeric phosphoric and phosphonic acid esters, phosphonate amines and phosphazenes. It is also possible for a mixture of a plurality of components selected from one or more of these groups to be used as flameproofing agents. It is also possible to use other, preferably halogen-free phosphorus compounds that are not mentioned specifically here, on their own or in arbitrary combination with other, preferably halogen-free phosphorus compounds. Suitable phosphorus compounds include, for example: tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged di- and oligo-phosphate, and bisphenol A-bridged di- and oligo-phosphate. The use of oligomeric phosphoric acid esters derived from bisphenol A is particularly preferred. Phosphorus compounds that are suitable as flameproofing agents are known (see e.g. EP-A 0 363 608, EP-A 0 640 655) or can be prepared by known methods in an analogous manner (e.g. Ullmanns Enzyklopädie der technischen Chemie, Vol. 18, p. 301 ff 1979; Houben-Weyl, Methoden der organischen Chemie, Vol. 12/1, p. 43; Beilstein Vol. 6, p. 177).

Preparation of the Moulding Compositions and Moulded Bodies

The thermoplastic moulding compositions according to the invention can be prepared, for example, by mixing the constituents in a known manner and melt compounding and melt extruding the mixture at temperatures of from 200° C. to 340° C., preferably from 240 to 300° C., in conventional devices such as internal kneaders, extruders and twin-shaft screws.

Mixing of the individual constituents can be carried out, in known manner, either in succession or simultaneously, either at about 20° C. (room temperature) or at a higher temperature.

The present invention also provides a process for the preparation of the moulding compositions and the use of the moulding compositions in the production of moulded bodies.

The moulding compositions according to the present invention can be used, for example, in the production of moulded bodies of any kind. These can be produced, for example, by injection moulding, extrusion and blow moulding processes. A further form of processing is the production of moulded bodies by deep-drawing from previously produced sheets or films.

Examples of such moulded bodies include films, profiles, casing parts of any kind, for example for domestic appliances such as juice extractors, coffee makers, mixers; for office equipment such as monitors, flat screens, notebooks, printers, copiers; sheets, tubes, conduits for electrical installations, windows, doors and further profiles for the construction sector (interior fitting and external applications) as well as parts for electronics and electrical engineering, such as switches, plugs and sockets, as well as bodywork and interior components for commercial vehicles, in particular for the automotive sector.

The moulding compositions according to the invention can also be used, for example, in the production one or more of the following moulded bodies or mouldings: Parts for the interior finishing of railway vehicles, ships, aircraft, buses and other motor vehicles, casings for electrical devices containing small transformers, casings for devices for disseminating and transmitting information, casings and coverings for medical devices, massage devices and casings therefor, toy vehicles for children, prefabricated wall panels, casings for security devices, heat-insulated transport containers, mouldings for sanitary and bathroom fittings, cover grids for ventilator openings, and casings for garden equipment. Other moulded bodies and/or mouldings are also contemplated.

The moulding compositions according to the present invention are particularly suitable for the production of (unlacquered) automotive interior components and bodywork parts which must withstand the effects of light, heat and optionally weathering.

The examples which follow serve to explain the invention further.

EXAMPLES

Component A1

Linear polycarbonate based on bisphenol A having a weight-average molecular weight $\overline{M}w$ of 25,000 g/mol (determined by GPC).

Component B1

Graft polymer consisting of 28 wt. % styrene-acrylonitrile copolymer as shell with a ratio of styrene to acrylonitrile of 71:29 on 72 wt. % of a graft base as core consisting of 46 wt. % silicone rubber and 54 wt. % butyl acrylate rubber, prepared by emulsion polymerisation.

Component B2 (Comparison)

Graft polymer consisting of 40 wt. % styrene-acrylonitrile copolymer with a ratio of styrene to acrylonitrile of 72:28 wt. % as shell on 60 wt. % of a particulate graft base as core consisting of pure polybutadiene rubber, prepared by emulsion polymerisation.

Component B3 (Comparison)

Graft polymer consisting of 39 wt. % styrene-acrylonitrile copolymer as shell on 61 wt. % of a graft base as core consisting of butyl acrylate rubber, prepared by emulsion polymerisation.

Component B4 (Comparison)

Graft polymer consisting of 40 wt. % styrene-acrylonitrile copolymer with a ratio of styrene to acrylonitrile of 76:24 as shell on 60 wt. % of a silicone rubber graft base as core, prepared by emulsion polymerisation.

Component C

Styrene/acrylonitrile copolymer having a styrene/acrylonitrile weight ratio of 76:24 wt. % and a mean molecular weight Mw of 100,000 g/mol (measured by GPC in dimethylformamide at 20° C.).

Component D

D1: pentaerythritol tetrastearate as lubricant/mould release agent
D2: heat stabiliser, Irganox® B 900, Ciba Speciality Chemicals
D3: UV stabiliser Tinuvin 329, Ciba Speciality Chemicals
D4: Black Pearls 800, Cabot Europa G.I.E., Suresnes, France.

Preparation and Testing of the Moulding Compositions

The substances listed in Table 1 are compounded at a speed of 225 rpm and with a throughput of 20 kg/h, at a melt temperature of 260° C. and with a degassing vacuum of 100 mbar, on a twin-screw extruder (ZSK-25) (Werner and Pfleiderer) and then granulated. The finished granules are processed on an injection-moulding machine to the corresponding test specimens (melt temperature 260° C., tool temperature 80° C.).

The following methods are used to characterise the properties of the test specimens:

The behaviour in the multiaxial penetration test is used as the measure for the low-temperature ductility in the crash test with practical relevance. The penetration test is carried out in accordance with ISO 6603-2 at a temperature of −10° C. on test specimens of dimensions 60 mm×60 mm×2 mm. In this test, the maximum energy absorption is determined on the one hand, and on the other hand in particular the fracture patterns of a total of ten test specimens are assessed as to whether splinter-free behaviour occurs in the large majority (at least 90%) of the tests, that is to say in at least 9 out of 10 experiments.

The Vicat B120 value, measured in accordance with ISO 306 on test specimens of dimensions 80 mm×10 mm×4 mm, is used as the measure for the heat distortion resistance.

The melt viscosity at 260° C. and with a shear rate of 1000 $s^{-1}$, measured in accordance with ISO 11443, is used as the measure for the melt flowability.

The L value, measured in reflection on compositions comprising 0.75 part by weight of carbon black in accordance with DIN 6174, is used as the measure of the dyeability.

TABLE 1

Compositions and their properties

| Composition [parts by weight] | 1 (comp.) | 2 | 3 | 4 (comp.) | 5 (comp.) | 6 (comp.) | 7 (comp.) | 8 (comp.) |
|---|---|---|---|---|---|---|---|---|
| A-1 | 75 | 75 | 75 | 75 | 75 | 75 | 75 | 75 |
| B-1 | 4 | 7 | 9 | 12 | | | | |
| B-2 | | | | | 7 | | | |
| B-3 | | | | | | 7 | | 3.5 |
| B-4 | | | | | | | 7 | 3.5 |
| C-1 | 21 | 18 | 16 | 13 | 18 | 18 | 18 | 18 |
| D-1 | 0.75 | 0.75 | 0.75 | 0.75 | 0.75 | 0.75 | 0.75 | 0.75 |
| D-2 | 0.1 | 0.1 | 0.1 | 0.1 | 0.1 | 0.1 | 0.1 | 0.1 |
| D-3 | 0.8 | 0.8 | 0.8 | 0.8 | 0.8 | 0.8 | 0.8 | 0.8 |

TABLE 1-continued

Compositions and their properties

| Composition [parts by weight] | 1 (comp.) | 2 | 3 | 4 (comp.) | 5 (comp.) | 6 (comp.) | 7 (comp.) | 8 (comp.) |
|---|---|---|---|---|---|---|---|---|
| D-4 | 0.75 | 0.75 | 0.75 | 0.75 | 0.75 | 0.75 | 0.75 | 0.75 |
| Weight ratio of B:C | 1:5.25 | 1:2.57 | 1:1.78 | 1:1.08 | 1:2.57 | 1:2.57 | 1:2.57 | 1:2.57 |
| Double-bond-free rubber | yes | yes | yes | yes | no | yes | yes | yes |
| Properties | | | | | | | | |
| Splintering fracture behaviour at −10° C. | yes | no | no | no | no | yes | no | yes |
| Energy absorption at −10° C. [J] | 39 | 42 | 38 | 39 | 38 | 28 | 41 | 41 |
| Melt viscosity (260° C./1000 s$^{-1}$) [Pas] | 214 | 227 | 230 | 260 | 230 | 210 | 228 | 228 |
| Vicat B120 [° C.] | 132 | 132 | 132 | 132 | 132 | 131 | 132 | 132 |
| Reflection L | 28.6 | 29.8 | 29.8 | 30.3 | 27.9 | 27.4 | 31.6 | 29.2 |

The examples in Table 1 show that the advantages in terms of properties according to the object of this invention are achieved only with those compositions in which the graft polymer B and the vinyl (co)polymer C are present in the ratio specified according to the invention and in which there is used as the graft polymer B a graft polymer based on a silicone-acrylate composite rubber as graft base (see Examples 2 and 3 according to the invention). If the permitted content of the graft polymer B is exceeded, moulding compositions having poor dyeability and a high melt viscosity, that is to say unsatisfactory processing behaviour, are obtained (Comparison Example 4). If too little graft polymer B is used, inadequate multiaxial low-temperature ductility is obtained (Comparison Example 1).

When graft polymer based on pure acrylate rubber is used, inadequate multiaxial low-temperature ductility is likewise obtained (Comparison Example 6). The use of graft polymer based on pure silicone rubber results in unsatisfactory dyeability (Comparison Example 7). If a mixture of two graft polymers based on a) pure acrylate rubber and b) pure silicone rubber is used, inadequate multiaxial low-temperature ductility is again obtained (Comparison Example 8). Although the use of graft polymers based on butadiene rubber yields good ductility, flowability and dyeability (Comparison Example 5), the aging resistance of such compositions to the effects of heat, light and weathering is naturally unsatisfactory for many applications because the rubber base is sensitive to oxidation because it is unsaturated.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

In the present description and in the following claims, to the extent a numerical value is enumerated, such value is intended to refer to the exact value and values close to that value that would amount to an insubstantial change from the listed value.

What is claimed is:

1. A composition consisting of
   A) from 60 to 86 parts by weight, based on the sum of components A+B+C, of an aromatic polycarbonate and/or an aromatic polyester carbonate,
   B) from 4 to 12 parts by weight, based on the sum of components A+B+C, of a graft polymer comprising
      B.1 from 10 to 50 wt. %, based on the graft polymer B, of a shell of at least one vinyl monomer, and
      B.2 from 90 to 50 wt. %, based on the graft polymer B, of a graft base of a silicone-acrylate composite rubber, wherein the silicone-acrylate composite rubber comprises an interpenetrating network of silicone rubber and acrylate rubber,
   C) from 10 to 30 parts by weight, based on the sum of components A+B+C, of at least one rubber-free vinyl (co)polymer of
      C.1 from 50 to 99 parts by weight, based on component C, of a vinyl aromatic compound and/or a vinyl aromatic compound substituted on the ring and/or a (meth)acrylic acid (C1-C8)-alkyl ester, and
      C.2 from 1 to 50 parts by weight, based on component C, of a vinyl cyanide and/or a (meth)acrylic acid (C1-C8)-alkyl ester and/or an unsaturated carboxylic acid and/or an anhydride of an unsaturated carboxylic acid and an imide of an unsaturated carboxylic acid, and
   D) from 0 to 20 parts by weight, based on the sum of components A+B+C, of at least one polymer additive selected from the group consisting of flameproofing agents, flameproofing synergists, antidripping agents, lubricants and mould release agents, nucleating agents, stabilisers, antistatics, colourings and pigments wherein components B and C are present in a ratio of the parts by weight of B:C in a range from 1:1.3 to 1:3.5, and wherein the composition is free of inorganic filler.

2. A composition according to claim 1, consisting of
   A) from 70 to 80 parts by weight, based on the sum of components A+B+C, of an aromatic polycarbonate and/or an aromatic polyester carbonate,
   B) from 6 to 10 parts by weight, based on the sum of components A+B+C, of said graft polymer,
   C) from 14 to 20 parts by weight, based on the sum of components A+B+C, of at least one rubber-free vinyl (co)polymer, and
   D) from 0.2 to 5 parts by weight, based on the sum of components A+B+C, of at least one polymer additive, wherein components B and C are present in a ratio of the parts by weight of B:C in a range from 1:1.6 to 1:2.7.

3. A composition according to claim 1 comprising as the graft base B.2, a composite rubber comprising from 10 to 70 wt. % silicone rubber and from 90 to 30 wt. % butyl acrylate rubber, based in each case on the weight of graft base B.2.

4. A composition according to claim 3 comprising as the graft base B.2, a composite rubber comprising from 20 to 60 wt. % silicone rubber and from 80 to 40 wt. % butyl acrylate rubber, based in each case on the weight of graft base B.2.

5. A composition according to claim 1 comprising as component A, an aromatic polycarbonate and/or aromatic polyester carbonate having a weight-average molecular weight $M_w$, of from 22,000 to 32,000 g/mol.

6. A composition according to claim 1 comprising as component A, an aromatic polycarbonate and/or aromatic polyester carbonate having a weight-average molecular weight of from 24,000 to 28,000 g/mol.

7. A composition according to claim 1 comprising as the graft base B.2, a silicone-acrylate composite rubber having at least one graft-active site, wherein the silicone rubber and the acrylate rubber interpenetrate in the composite rubber so that said silicone rubber and said acrylate rubber cannot substantially be separated from each another.

8. A composition according to claim 1 comprising as the graft shell B.1, a methyl methacrylate and/or a mixture of styrene and acrylonitrile.

9. A composition according to claim 1 comprising as component C, a copolymer of C.1 styrene and C.2 acrylonitrile.

10. A composition according to claim 1 comprising as component C, polymethyl methacrylate and/or a vinyl copolymer comprising at least 70 parts by weight based on component C, of methyl methacrylate and up to 30 parts by weight based on component C, of at least one comonomer selected from the group consisting of styrene, n-butyl acrylate, tert-butyl acrylate and ethyl acrylate.

11. A moulding comprising a composition according to claim 1.

12. A polycarbonate composition according to claim 1, which does not display a splintering fracture in a multiaxial dart-penetration test at −10°, has a melt viscosity at 260° C. and a shear rate of 1000 $s^{-1}$ of not more than 250 Pas and exhibits a Vicat B120 heat distortion resistance temperature of at least 125° C.

13. A method for making a composition of claim 1 comprising mixing A, B, C and optionally D and melt extruding the resultant.

* * * * *